(12) United States Patent
Tavallaei

(10) Patent No.: US 6,360,291 B1
(45) Date of Patent: Mar. 19, 2002

(54) SYSTEM AND METHOD FOR HIDING PERIPHERAL DEVICES IN A COMPUTER SYSTEM

(75) Inventor: Siamak Tavallaei, Spring, TX (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 09/241,203

(22) Filed: Feb. 1, 1999

(51) Int. Cl.$^7$ ................................................ G06F 13/14
(52) U.S. Cl. ...................... 710/129; 710/126; 710/104; 710/100; 710/8
(58) Field of Search ................................ 710/8–38, 49, 710/128–131, 101–107, 119–123; 709/100, 250; 348/552; 370/395; 445/47

(56) References Cited

U.S. PATENT DOCUMENTS

| | | | | |
|---|---|---|---|---|
| 5,692,219 A | * | 11/1997 | Chan et al. | 710/49 |
| 5,799,207 A | * | 8/1998 | Wang et al. | 710/38 |
| 5,838,935 A | * | 11/1998 | Han et al. | 445/47 |
| 5,848,249 A | * | 12/1998 | Garbus et al. | 710/128 |
| 5,884,027 A | * | 3/1999 | Garbus et al. | 709/250 |
| 5,913,045 A | * | 6/1999 | Gillespie et al. | 710/129 |
| 6,094,690 A | * | 7/2000 | Lee | 710/10 |
| 6,094,699 A | * | 7/2000 | Surugucchi et al. | 710/128 |
| 6,100,936 A | * | 8/2000 | Jordan et al. | 348/552 |
| 6,134,579 A | * | 10/2000 | Trvallaei et al. | 709/100 |
| 6,141,708 A | * | 10/2000 | Trvallaei et al. | 710/62 |
| 6,157,645 A | * | 12/2000 | Shobatake | 370/395 |
| 6,161,157 A | * | 12/2000 | Tripathi et al. | 710/109 |
| 6,173,341 B1 | * | 1/2001 | Emerson et al. | 710/8 |

OTHER PUBLICATIONS

Mendel, Brett; "Server I/O all set to flow"; *Lantimes*, Oct. 27, 1997, vol. 14, Issue 22; cover page and p. 31.

Briggs, Chris; "Smarter and Faster I/O for Servers"; CORE: Operating Systems; *Byte*, May 1, 1996, vol. 2, No. 5.

Thompson, Tom; "I2O Beats I/O Bottlenecks"; *Byte*, Aug. 1997, pp. 85, 86 and 3 additional pages.

I2O Introduction; Technology Backgrounder; Aug. 13, 1997; http://www.i2osig.org/Architecture/TechBack.html.

i960®RP I/O Processor—the I2O SIG site; http://134.134.214.1/design/iio/i2osig.html; Feb. 6, 1998.

"Welcome to the I2O SIG® Web Site!"; http://www.i2osig.org; Feb. 6, 1998.

"About I2O Technology"; http://www.i2osig.org/Architecture; Feb. 6, 1998.

"Technology Backgrounder"; http://www.i2osig.org/Architecture/TechBack.html; Feb. 6, 1998; 6 pages.

"Questions and Answers"; http://www.i2osig.org/Architecture/QandA.html; Feb. 6, 1998; 4 pages.

(List continued on next page.)

Primary Examiner—Christopher B. Shin
(74) Attorney, Agent, or Firm—Fletcher, Yoder & Van Someren

(57) ABSTRACT

A computer system with an Intelligent Input/Output architecture having a dynamic device blocking mechanism for hiding at least a portion of peripheral devices. The computer system comprises at least one host processor for executing a host operating system, the host processor disposed on a host bus, an input/output (I/O) bus operably coupled to the host bus via a host-to-bus bridge, and a plurality of peripheral devices operably connected to the I/O bus for transferring data in I/O transactions controlled by an IOP resource. A plurality of I/O bus signals are supplied to the device blocking module for determining which bus master owns the I/O bus in order to initiate a bus cycle. If the bus cycle is about to be commenced on behalf of the host processor and its OS, an enable signal associated with the selected peripheral device is negated until the cycle is completed. If, on the other hand, the bus cycle is initiated by the IOP, the enable signal is asserted for the duration of the transaction, which signal, otherwise, remains in a negated state.

3 Claims, 7 Drawing Sheets

OTHER PUBLICATIONS

"I2O® Specifications For Non–Members"; http://www.i2osig.org/Architecture/GetSpec.html; Feb. 6, 1998.

Amdahl, Carlton G.; "I2O Future Directions"; http://www.i2osig.org; Jun. 1996; 12 pages.

Goble, Scott, et al.; "Intelligent I/O Architecture"; http://www.i2osig.org; Jun. 1996; 22 pages.

"Press Releases and Clips"; http://www.i2osig.org/Press; Feb. 6, 1998; 4 pages.

Listing of Press Releases ; http://altavista.digital.com/cgi-bin/quer . . . =21%2FMar%F86&d1=&search.x=46&search.y=6; Feb. 6, 1998; 2 pages.

Crothers, Brooke; "Intel server chip gets big backing"; Oct. 7, 1997; http://www.news.com/News/Item/0,4,14962,00.html; Feb. 6, 1998.

"HP Demonstrates Commitment to I2O Standard With New I2O Disk–array Controller"; *Hewlett Packard*; Press Release, Atlanta, Oct. 8, 1997; http://hpcc.920.external.hp.com/pressrel/oct97/08oct97b.html; Feb. 6, 1998; 2 pages.

"I2O Disaster in the making for the freeware community"; http://22.kenandted.com/i2o/disaster.html; Feb. 6, 1998; 2 pages.

* cited by examiner

SYSTEM AND METHOD FOR HIDING PERIPHERAL DEVICES IN A COMPUTER SYSTEM

BACKGROUND OF THE INVENTION

1. Field of the Invention

The present invention relates to computer systems with novel input-output (I/O) architectures, and more particularly, and not by way of limitation, to systems for hiding peripheral devices connected to a bus from the host operating system and associated host processor.

2. Description of Related Art

A conventional computer system typically includes one or more central processing units (CPUs) capable of executing algorithms and one or more memory subsystems. Computer systems also include peripheral devices, or, peripherals, for inputting and outputting data. Some common peripheral devices include, for example, monitors, keyboards, printers, modems, hard disk drives, floppy disk drives, and network controllers. As known in the art, peripheral devices may be conveniently categorized into several classes based on their functionality. For example, the "block storage device" class of peripherals may include hard disk drives, whereas the "Local Area Network (LAN) ports" class may include LAN controllers, such as, for example, Ethernet controllers. The various components of a computer system communicate and transfer data using a bus system which is connected to the communicating components.

One of the key factors in the performance of a computer system is the speed at which the CPU operates. Generally, the faster the CPU operates, the faster the computer system can complete a designated task. Another method of increasing the speed of a computer system is using multiple CPUs, commonly known as multi-processing. With multiple CPUs, algorithms required to complete a task can be executed substantially in parallel as opposed to their sequential execution.

However, the addition of a faster CPU or additional CPUs can result in different increases in performance among different computer systems. Although it is the CPU that executes the algorithms required for performing a designated task, in many cases, it is the peripherals that are responsible for providing data to the CPU and storing or outputting the processed data from the CPU. When a CPU in operation attempts to read or write to a peripheral, the CPU often "sets aside" the algorithm which it is currently executing and is diverted to executing the read/write transaction (also referred to as an Input/Output transaction, or an I/O transaction) for the peripheral. As can be appreciated by those skilled in the art, the length of time that the CPU is diverted is typically dependent on the efficiency of the I/O transaction.

Although a faster CPU may accelerate the execution of an algorithm, a slow or inefficient I/O transaction process associated therewith would create a bottleneck in the overall performance of the computer system. As the CPU becomes faster, the amount of time executing algorithms becomes less of a limiting factor compared to the time expended in performing an I/O transaction. Accordingly, the improvement in the performance of the computer system that could theoretically result from the use of a faster CPU or the addition of another CPU may become substantially curtailed by the bottleneck created by I/O transactions. Moreover, it can be readily appreciated that any performance degradation due to such I/O bottlenecks in a single computer system may have a stifling effect on the overall performance of a computer network in which the computer system is disposed.

Operating peripheral devices in association with a computer system typically requires a piece of executable code, known commonly as a device driver. Because peripherals are often manufactured separately from the CPU, the operation of a peripheral is generally effectuated by a unique device driver associated with the specific peripheral. The device driver, which controls the peripheral, is an executable computer program that is executed by the CPU and must be compatible with the particular operating system (OS) of the computer system. It can be readily seen that because device drivers are unique to both operating systems as well as peripherals, a considerable number of device drivers are typically required to support the numerous possible combinations of peripherals and operating systems. Accordingly, it can be appreciated that the ensuing device driver proliferation thwarts the objective of device driver portability in the design of cross-platform computer system architectures.

Based on the foregoing discussion, it should be appreciated that current computer systems with a conventional I/O architecture utilizing device drivers described above suffer from a lack of device driver portability and performance constraints due to I/O bottlenecks. In order to address these shortcomings, an alternative I/O architecture—commonly known as the Intelligent Input/Output ($I_2O$) architecture—has been developed in the computer industry. Because the teachings of the present invention may be better described in relation to the $I_2O$ architecture, a brief overview thereof is provided hereinbelow.

The $I_2O$ architecture uses a "split driver" model which inserts a messaging layer between the portion of the device driver specific to the operating system and the portion of the device driver specific to the peripheral. The messaging layer splits the single device driver of today into two separate modules—an Operating System Service Module (OSM) and a Downloadable Driver Module (DDM). The only interaction one module has with another module is through this messaging layer which provides the communication means.

The OSM comprises the portion of the device driver that is specific to the operating system. The OSM interfaces with the operating system of the computer system (which may also be referred to in the art as the "host operating system") and is executed by the host CPU or processor. Typically, a single OSM may be used to service a specific class of peripherals. For example, one OSM would be used to service all block storage devices, such as hard disk drives and CD-ROM drives. The DDM provides the peripheral-specific portion of the device driver that understands how to interface to the particular peripheral hardware. To execute the DDM, an $I_2O$ Input/Output Processor (IOP) is added to the computer system. A single IOP may be associated with multiple peripherals, each controlled by a particular DDM, and containing its own operating system such as, for example, the $I_2O$ Real-Time Operating System (iRTOS). The DDM directly controls the peripheral, and is executed by the IOP under the management of the iRTOS.

Those skilled in the art will recognize that a DDM may typically comprise a Hardware Device Module (HDM) that directly interfaces with the peripheral and is responsible for its control and data transfer associated therewith. DDMs can also comprise an Intermediate Service Module (ISM) which is an additional software interface to the HDM. The ISM is often used for filtering, encoding, and decoding messages to the HDM.

In general operation, the communication model used in the $I_2O$ architecture is a message passing system. When the CPU seeks to read or write to a peripheral in an $I_2O$ system, the host operating system makes what is known as a "request". The OSM translates the request by the host operating system and, in turn, generates a message. The OSM sends the message across the messaging layer to the DDM associated with the peripheral which processes it appropriately to achieve a result. Upon completion of the processing, the DDM sends the result back to the OSM by sending an appropriate message through the messaging layer. It can be appreciated that to the host operating system, the OSM appears just like any other device driver.

By executing the DDM on the IOP, the time-consuming portion of transferring information from and to the peripheral hardware is off-loaded from the CPU to the IOP. With this off-loading, the CPU is no longer diverted for inordinate amounts of time during an I/O transaction. Moreover, because the IOP is a hardware component essentially dedicated to the processing of the I/O transactions, the problem of I/O bottlenecks is mitigated.

The $I_2O$ architecture also significantly reduces the number of device drivers written on the basis of the split driver model. Typically, peripheral device manufacturers need only write a single DDM for a particular peripheral which can now operate with any host operating system. The vendors of the host operating system need only write one OSM for each class of peripherals, e.g., the network controller class.

One of the goals of the $I_2O$ architecture is to allow standard "non-intelligent" or "semi-intelligent" peripheral devices to be controlled by a generic $I_2O$ IOP resource (for example, an $I_2O$ "accelerator" card) that could be added to a computing system. If the IOP contains the necessary software to control a particular peripheral device, the device may be abstracted through the IOP to "look" like an intelligent $I_2O$ peripheral. However, it may be appreciated that in order to incorporate the $I_2O$ technology in a computer system and realize the benefits afforded thereby, host processors and operating systems need to be able to differentiate between peripheral devices that are subordinate to the IOP resource (that is, peripherals under the control of the I/O processor) and peripheral devices that are not (that is, "system" or "public" peripherals under the control of the host processor/s). Although system software that is $I_2O$-compliant is typically capable of making this distinction, legacy software, i.e., software developed and deployed prior to the development of the $I_2O$ architecture or which is otherwise not $I_2O$-compliant, on the other hand, usually cannot make this distinction. Therefore, to retain the investment made in the legacy software through its continued use while at the same time realizing the benefits of the $I_2O$ technology, there has arisen a substantial need for schemes whereby subordinate peripheral devices are rendered "invisible" or "hidden" from host processors and host operating systems.

One of the current methods used for hiding peripheral devices involves the use of a bus-to-bus bridge, for example, a bridge device coupling two buses, such as the Peripheral Component Interconnect (PCI) buses, and a private address space allocation mechanism used by a particular IOP that is common in the industry. Devices under the control of the IOP are hidden from the host processors and their related software by placing these devices behind the PCI-to-PCI bridge and allocating memory address space to the downstream PCI bus for address information pertaining to them. The allocated memory address space is inaccessible by the host processors and, thus, the peripheral devices are rendered invisible thereto.

Another method of hiding peripheral devices involves the use of certain switching devices (for example, components known in the industry as "quick switches"). The switching devices may be employed under the control of an $I_2O$ accelerator card having an I/O processor thereon for blocking a PCI signal line (Initialization Device Select or IDSEL signal) that is used as a "chip select" signal for the peripheral devices during their configuration. The firmware running on the $I_2O$ accelerator undertakes a decision making process as to when the IDSEL signal is to be asserted for a particular subordinate peripheral device.

Solutions, such as those described hereinabove, for hiding peripheral devices from host processors have various deficiencies and shortcomings. For example, one approach requires a PCI-PCI bridge and the use of a particular type of IOP with its private address space allocation mechanism. Also, in this approach, it is required that the devices be placed down-stream from the PCI-PCI bridge for hiding them. The static "quick switch" approach, on the other hand, suffers from the risk of "inappropriate" timing of the blocking and unblocking of the IDSEL signals by the $I_2O$ accelerator card. Typically, the $I_2O$ accelerator firmware sets a "masking" bit corresponding to a particular subordinate device, which masking bit then masks an enable signal— IDSEL ENABLE—therefor, thereby causing the device's IDSEL signal to be deasserted. Subsequently, when the $I_2O$ accelerator wants to communicate to the subordinate device, it negates the mask by clearing the appropriate bit, thereby causing the corresponding IDSEL ENABLE signal to be asserted. It is possible that when the $I_2O$ accelerator unblocks a particular IDSEL signal for a corresponding subordinate device, another bus master—including a host processor under the host OS—may gain control of the bus and attempt to access the subordinate peripheral device. It can be appreciated that such an attempt to access the subordinate device by the host processor may yield undesirable results.

SUMMARY OF THE INVENTION

The present invention overcomes the above-identified problems as well as other shortcomings and deficiencies of the existing technology by providing a system wherein the goal of hiding the subordinate peripheral devices from the host processor/s and host operating systems is achieved by determining when a host-associated bus transaction is about to be effectuated on a bus to which the subordinate devices are coupled. Preferably, the determination is made on the basis of one or more bus signals supplied to a dynamic device blocker module. Responsive to the determination, switching devices are selectively actuated based on a list of which peripherals are to be hidden.

Accordingly, the present invention is directed in one aspect to a computer system having a host processor, a processor bus and a host operating system executing on the host processor, comprising: a plurality of peripheral devices coupled to an input/output (I/O) bus that is, in turn, coupled to the processor bus via a host-to-bus bridge; and a device blocker module for receiving a plurality of bus signals associated with the I/O bus, wherein the device blocker module, based on the plurality of bus signals, hides at least a portion of the plurality of peripheral devices from at least one of the host processor and the operating system.

In another aspect, the present invention is directed to a computer system, comprising: at least one host processor for executing a host operating system, the host processor disposed on a host bus; a first input/output (I/O) bus operably coupled to the host bus via a host-to-bus bridge, which first I/O bus for propagating at least one of a FRAME signal, a GRANT signal, an IRDY signal and a clock signal associated therewith; a plurality of peripheral devices operably connected to the first I/O bus; a dynamic device blocker module disposed on the I/O bus for rendering at least a portion of the plurality of peripheral devices hidden from the host operating system based on at least one of the FRAME signal, the GRANT signal, the IRDY signal and the clock signal associated therewith; and an accelerator module disposed on the I/O bus for controlling the portion of plurality of peripheral devices hidden thereby.

The present invention is also drawn to a method of hiding a subordinate peripheral device disposed on an input/output (I/O) bus from a host processor and its software in a computer system, which computer system includes a host-to-bus bridge for coupling between the I/O bus and a host bus, and an I/O processor, comprising the steps of: monitoring one or more bus signals associated with the I/O bus; and based on the bus signals, selectively blocking or unblocking for a period of time an IDSEL signal associated with the subordinate peripheral device.

BRIEF DESCRIPTION OF THE DRAWINGS

A more complete understanding of the present invention may be had by reference to the following Detailed Description when taken in conjunction with the accompanying drawings wherein.

DETAILED DESCRIPTION OF THE DRAWINGS

The innovative teachings of the present application will be described with particular reference to numerous exemplary embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 1:
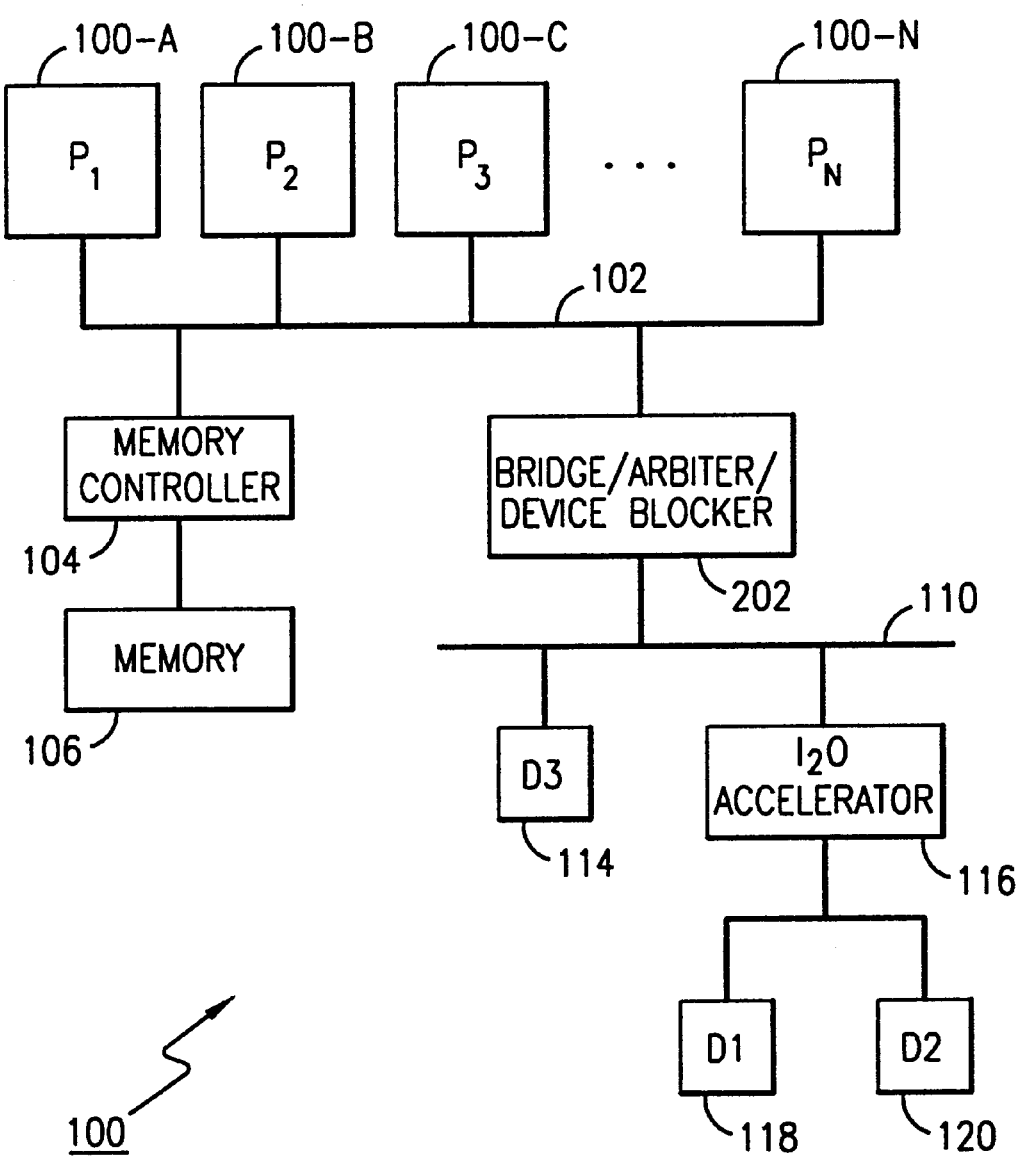
FIG. 1 is a block diagram of an exemplary embodiment of a computer system provided in accordance with the teachings of the present invention.

Referring now to the drawings wherein like or similar elements are designated with identical reference numerals throughout the several views, and wherein the various elements depicted are not necessarily drawn to scale, and, in particular to FIG. 1, a block diagram of an exemplary embodiment of a computer system 100 is depicted therein in accordance with the teachings of the present invention. The computer system 100 comprises one or more host processors or CPUs, for example, processors labeled as $P_1$ through $P_N$, with reference numerals 100-A through 100-N, respectively. A host bus 102 is interconnected among the processors 100-A through 100-N for providing a communication pathway. A memory controller 104 is disposed on the host bus 102 for controlling accesses to and from a memory 106.

Still referring to this exemplary embodiment, connected to the host bus 102 is an integrated component having bridge and bus arbiter functionality in addition to dynamic device blocking (DDB) capability, which component is labeled herein as bridge/arbiter/device blocker module 202. The dynamic device blocking component, provided in accordance with the teachings of the present invention, will be described in more detail hereinbelow in particular reference to FIGS. 5–7. It should be appreciated, however, that although in this exemplary embodiment the bus arbiter functionality is integrated within the module 202, it is possible to provide such arbiter functionality as a separate component coupled to the appropriate bus.

The module 202 provides a communication pathway between the host bus 102 and an input/output (I/O) bus 110 to which various peripheral devices may be attached. For example, the bus 110 may comprise a PCI bus providing a communication path among the PCI-compliant peripheral devices.

An IOP resource, e.g., $I_2O$ accelerator 116, comprising an Input/Output Processor and associated circuitry (not shown) is connected to the I/O bus 110. The $I_2O$ accelerator 116 is provided for harnessing the benefits of the $I_2O$ technology by controlling accesses to one or more subordinate peripheral devices, for example, devices D1 and D2, with reference numerals 118 and 120, respectively. In addition, one or more peripheral devices, for example, device D3 with reference numeral 114, may also be coupled to the I/O bus 110.

Figure 2:
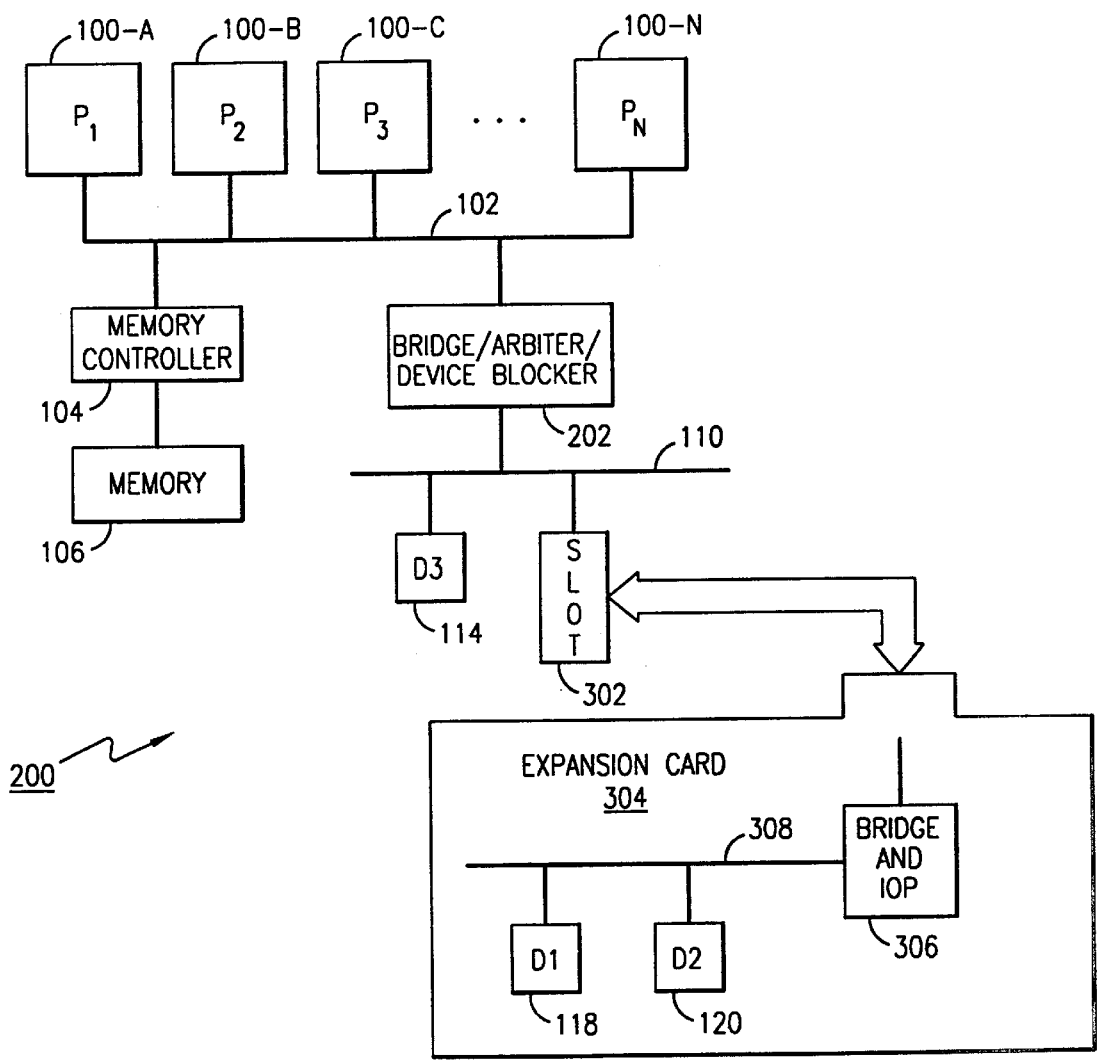
FIG. 2 is a block diagram of another exemplary embodiment of a computer system provided in accordance with the teachings of the present invention.
Figure 3:
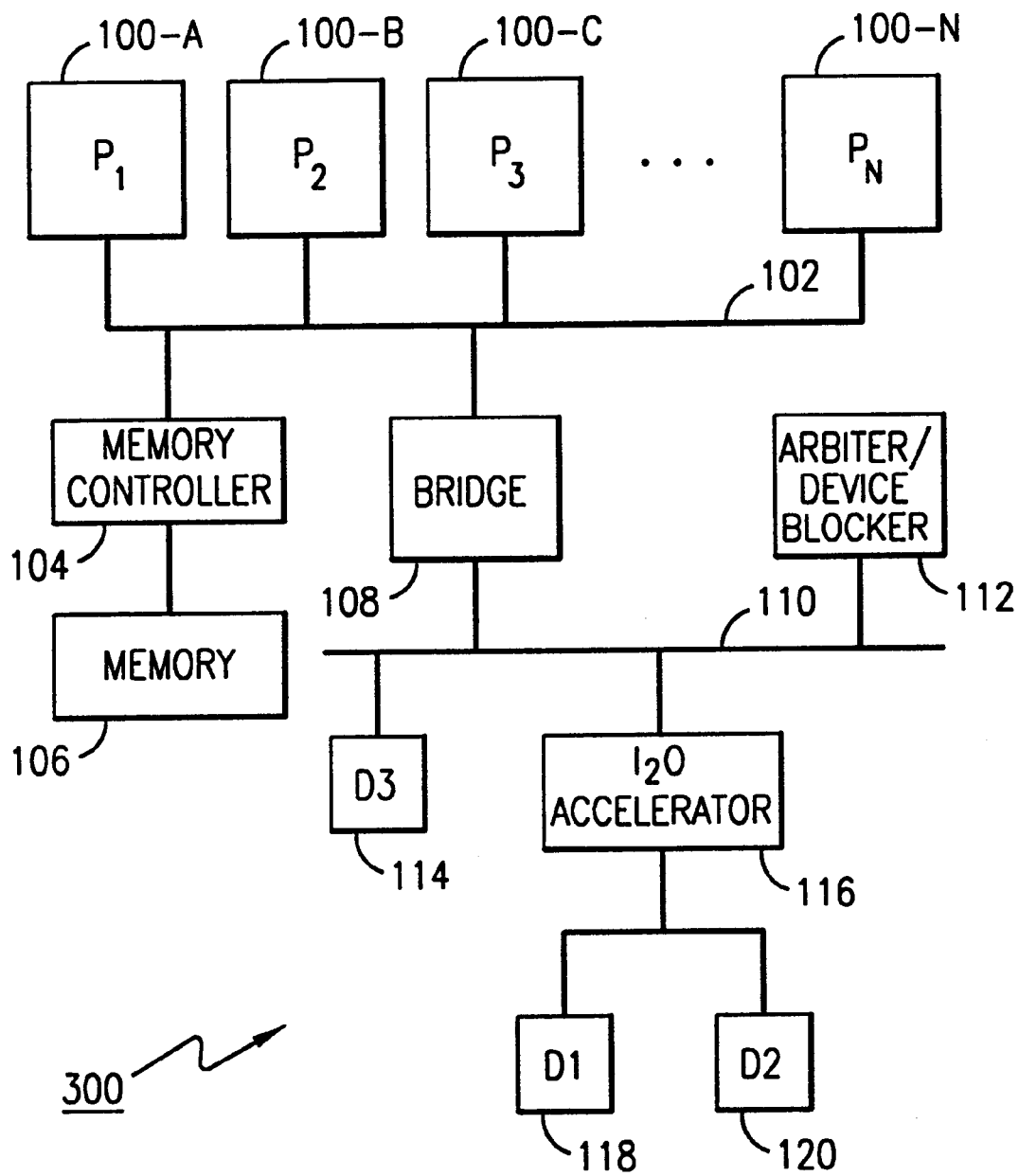
FIG. 3 is a block diagram of yet another exemplary embodiment of a computer system provided in accordance with the teachings of the present invention.

Referring now to FIGS. 2 and 3, block diagrams of other exemplary embodiments of computer system 200 and computer system 300, respectively, are shown in accordance with the teachings of the present invention. It can be seen that the computer systems 200 and 300 are similar to the computer system 100 described above. Accordingly, only salient distinguishing aspects of these exemplary embodiments will be described here.

In particular reference to FIG. 2, an expansion slot 302 is disposed on the bus 110 for facilitating cooperative coupling with an expansion card 304. A private bus 308 is provided on the expansion card 304 for interconnecting the subordinate peripheral devices 118 and $I_2O$ with a bridge 306 having an IOP and associated circuitry (not shown). As will be described later in more detail, the dynamic device blocking component of the present invention can be advantageously utilized in the computer system 200 so that the devices 118 and $I_2O$ are hidden from the host processors and operating systems.

In FIG. 3, the computer system 300 comprises a separate bridge 108 and arbiter/device blocker module 112. Again, the module 112 is provided in accordance with the teachings of the present invention so that the subordinate devices 118 and $I_2O$ are rendered hidden.

Figure 4:
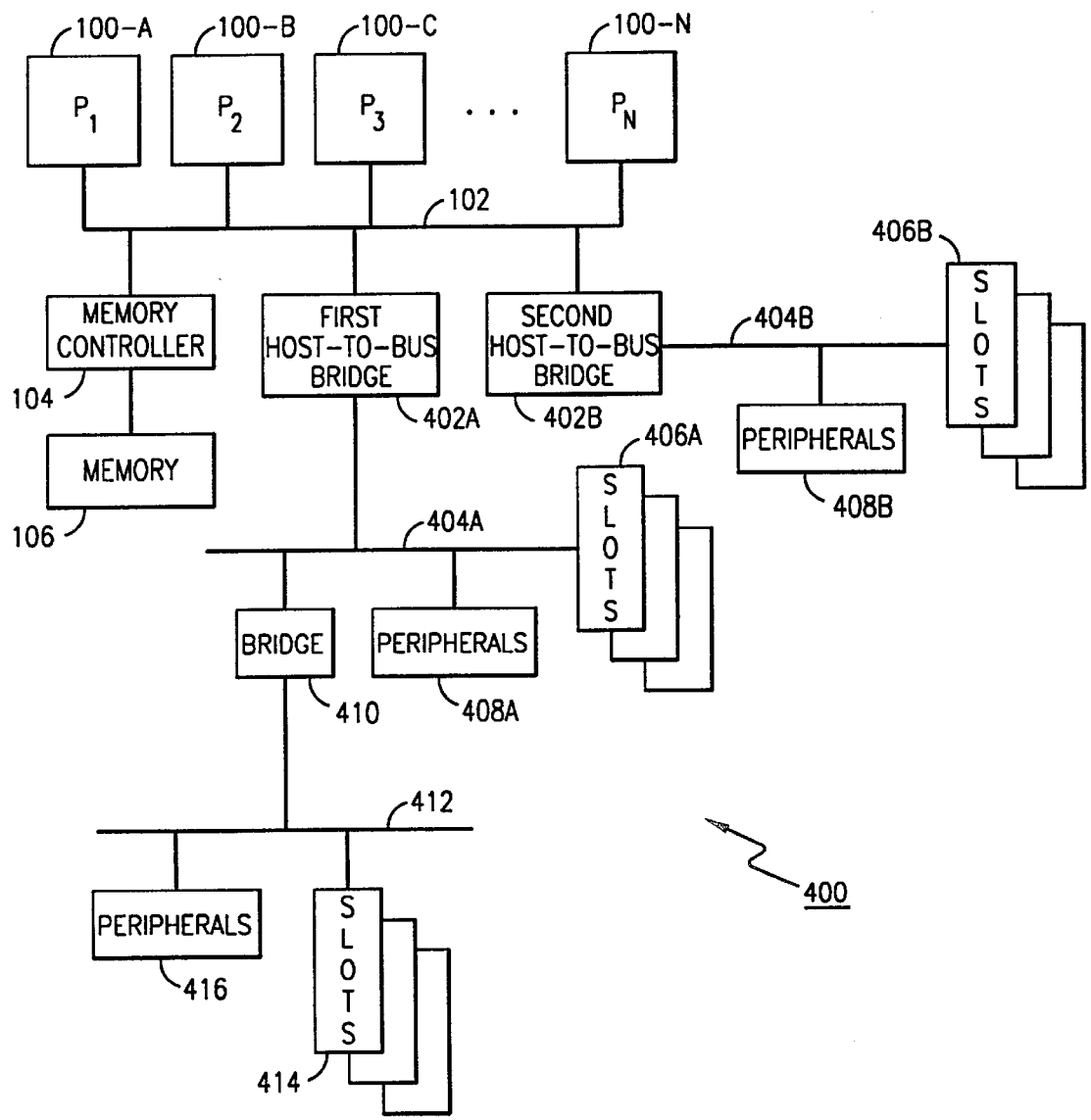
FIG. 4 is a block diagram of a still further exemplary embodiment of a computer system wherein the teachings of the present invention may be advantageously employed.

Referring now FIG. 4, a still further exemplary embodiment of a computer system 400 is shown in a block diagram wherein the teachings of the present invention may be advantageously employed. A first host-to-bus bridge 402A and a second host-to-bus bridge 402B are disposed on the host bus 102 for providing communication pathways to two separate buses, bus 404A and bus 404B, respectively. One or more peripheral devices 408B are coupled to the bus 404B. In addition, one or more expansion slots 406B are provided in connection with the bus 404B for adding various expansion cards (not shown). Similarly, one or more peripheral devices 408A and one or more expansion slots 406A also provided in connection with the bus 404A. A bus-to-bus bridge 410 is coupled between the bus 404A and an expansion bus 412 for providing a communication pathway therebetween. One or more peripheral devices 416, compatible with the expansion bus 412 and one or more compatible expansion slots 414 are also provided in connection with the expansion bus 412. Those skilled in the art can recognize that the buses 404A and 404B may typically comprise suitable PCI buses, whereas, the expansion bus 412 may be exemplified by an Extended Industry Standard Architecture (EISA) bus.

Still referring to FIG. 4, in a presently preferred exemplary embodiment of the computer system 400, the first host-to-bus bridge 402A is referred to as the compatibility bridge because it connects legacy buses and peripheral devices to the rest of the computer system 400. Examples of legacy buses and peripheral devices typically include: EISA and ISA buses, certain interrupt controllers, timers, hard disk controllers, et cetera. The second host-to-bus bridge 402B typically connects only to non-legacy devices, except certain video graphics devices.

Although not shown explicitly in this FIGURE, a dynamic device blocker module of the type described in reference to the foregoing FIGS. 1–3 may be provided with the computer system 400 in a number of ways. For example, its functionality may be integrated into either of the host-to-bus bridges 402A or 402B, into the bus-to-bus bridge 410, or as a separate structural element on any of the buses 404A, 404B or 412. Moreover, as will be apparent to one of ordinary skill in the art upon reference hereto, the functionality of the dynamic device blocker module—which may be either a PCI, ISA or EISA device, for example—may itself be embodied in separate sub-components dispersed either in proximal or distal relationship from one another through-out the computer system 400. Moreover, an I$_2$O accelerator (not shown in this FIGURE) may be provided in the computer system 400 in numerous ways for the purpose of controlling one or more of the peripheral devices depicted herein in accordance with the I$_2$O Specifications.

The dynamic device blocker functionality provided in accordance with the objects of the present invention may now be described in view of the cumulative teachings herein. Essentially, the goal of hiding the subordinate peripheral devices from the host OS running on one or more host processors is achieved by determining when a host-associated bus transaction is about to be effectuated on a bus to which the subordinate devices are connected. Responsive thereto, device enable/disable means such as, for example, quick switches or other switching devices, are selectively actuated based upon a defined list of which devices are to be hidden.

In one exemplary embodiment, the actuation of the device enable/disable means commences what may be termed as a "blocking window"—the duration within which the host-associated bus transaction is at least substantially completed. It can be appreciated that during the blocking window, the subordinate peripheral devices are rendered hidden to the host OS. After the completion of the host-associated bus transaction, appropriate device enable/disable means is selectively actuated so that the blocking window ceases, whereupon the subordinate peripheral devices become visible to the IOP resource such as an I$_2$O accelerator card.

In another exemplary embodiment, the device enable/disable means is actuated to continuously block the appropriate subordinate peripheral devices until the IOP resource is about to commence a bus transaction in order to access them.

As is known in the art, the state or status of an I/O bus such as, for example, the PCI bus, may be determined by monitoring one or more signals propagated on the bus. Moreover, in the case of a multi-initiator bus environment, it is also possible to determine which bus master (or, initiator) currently owns the bus for the purpose of starting a transaction. In the PCI bus environment, master agents indicate to a bus arbiter of their desire to use the bus by asserting a signal called REQUEST# or REQ#. After an appropriate arbitration scheme, the arbiter indicates to one of the master agents that it has the access to the bus by asserting a signal associated with that master, called GRANT# or GNT#. Once an access is thus granted, the current master drives a CYCLE FRAME# or FRAME# signal to indicate that a bus transaction is about to begin. Further, the master drives an INITIATOR READY# or IRDY# signal to indicate its ability to complete the current data phase of the bus transaction. A bus idle state is encountered in any clock period associated with the bus when both FRAME# and IRDY# are deasserted.

It can be readily appreciated by one of ordinary skill in the art upon reference hereto that by monitoring various bus signals, such as those described above, it is possible to discriminate between a host-associated bus transaction and an IOP transaction in an I$_2$O environment.

Figure 5:
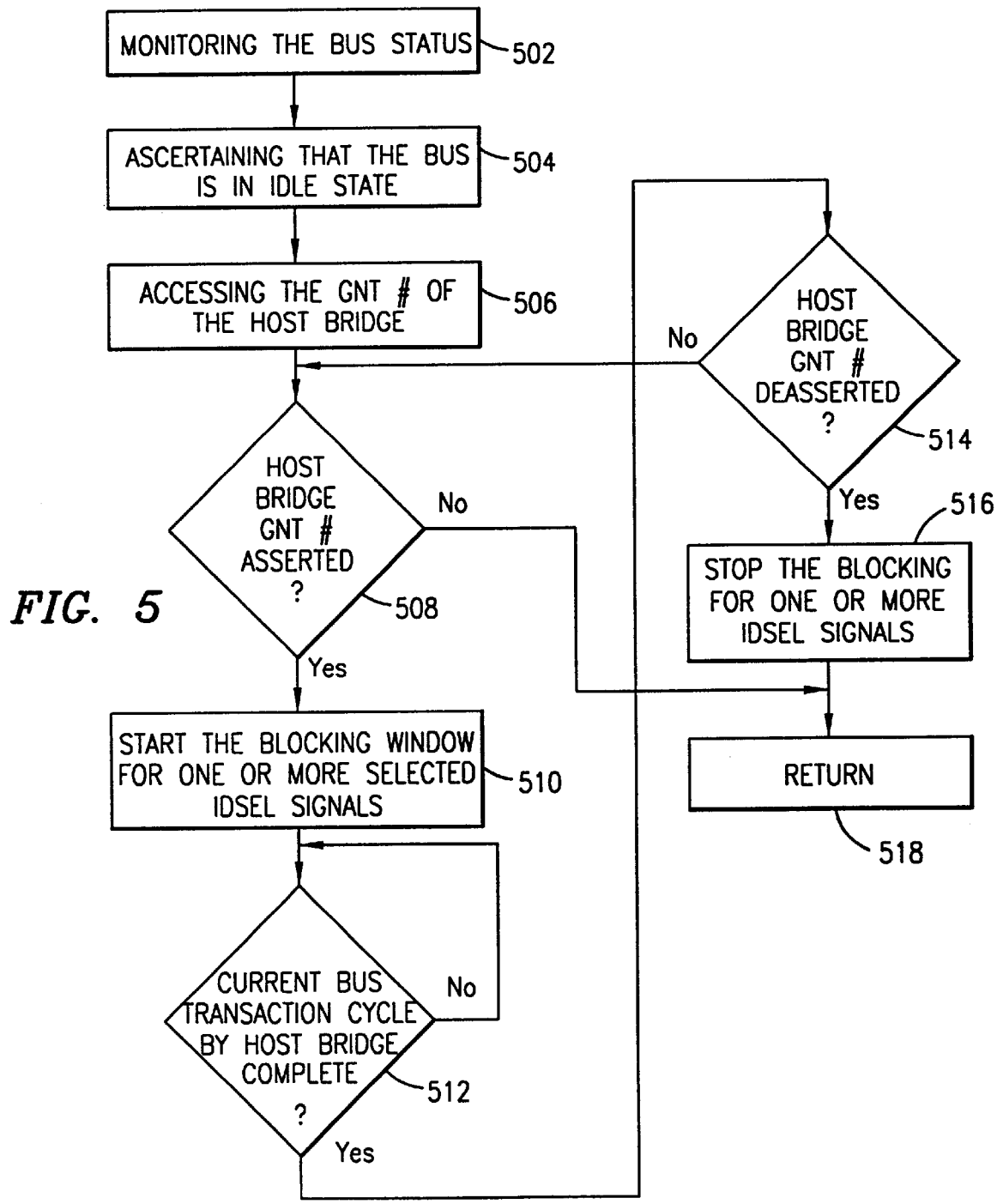
FIG. 5 depicts a flow chart of an exemplary embodiment of the methodology for dynamically blocking peripheral devices from a host processor and associated operating system in accordance with the teachings of the present invention.

Referring now to FIG. 5, a flow chart of an exemplary embodiment of the present invention is depicted. After monitoring the status of an I/O bus (e.g., a PCI bus), it is ascertained that the bus is in an idle state (steps 502 and 504). For a PCI bus, for example, the FRAME# and IRDY# are monitored to be in a deasserted state. When the host bridge or a bridge that is up-stream to the I/O bus to which subordinate peripherals are attached is granted bus access, that bridge is now capable of running a bus transaction on behalf of the host processor and its OS. The GNT# signal associated with that bridge is accessed (step 506) to determine if it is asserted (step 508). If it is not asserted, then the host processor (and its OS) is not attempting to run a bus transaction, and therefore, not capable of accessing the subordinate peripherals. The flow control simply returns (step 518). On the other hand, if the GNT# of the bridge is asserted, a blocking window is initiated for one or more selected subordinate devices (step 510). This is accomplished in an exemplary embodiment of the present invention by activating suitable device enable/disable means (e.g., switching devices such as quick switches) to deassert or negate a signal, called IDSEL ENABLE, for a selected subordinate device. This signal is produced or used in conjunction with the contents of a storage structure that defines which subordinate devices need to be masked from the host OS. Essentially, in one aspect, when the IDSEL ENABLE is asserted (or not masked), the IDSEL signal of a particular subordinate device will be in a non-blocked condition. Thus, the IDSEL signal will simply follow the appropriate level for the bus transaction. Otherwise, when the IDSEL ENABLE signal associated with the device is deasserted (or masked), the IDSEL signal of that device will be blocked or deasserted, signifying that it is now rendered inaccessible.

The storage structure defining which subordinate peripherals need to be hidden from the host OS may be implemented in numerous ways. For example, it may be embodied as a register in the I/O space, memory space or configuration space associated with a PCI bus. It may be embodied as an I/O port on any I/O bus, including, for example, an I$^2$C bus with an I/O expander. Accordingly, it should be appreciated that all these variations and arrangements as to how the subordinate devices that are to be hidden from the host OS are so defined are contemplated to be within the scope of the present invention.

Continuing to refer to FIG. 5, after starting the blocking window, the bus state is continued to be monitored to determine if the current transaction cycle by or on behalf of the host processor and its OS is at least substantially completed (step 512). Once again, this may be accomplished by observing the status of the FRAME# and IRDY# signals which will be deasserted (that is, driven high) upon the cycle completion. Subsequently, after determining that the GNT# signal is no longer asserted by the host bridge or up-stream bridge on behalf of the host OS (step 514), the blocking window is stopped (step 516). Accordingly, the deasserted IDSEL ENABLE signal for the appropriate subordinate device to be hidden is brought out of the forced inactive/masked state so that the device is rendered visible for subsequent accesses, if any, by the IOP resource.

It should be realized that the exemplary methodology described above is particularly adapted for use within a system where the bus arbiter is external to the host bridge, that is, arbiter functionality is not integrated therewith. For example, such an arrangement may be effectuated in exemplary computer systems 300 and 400 depicted in FIGS. 3 and 4, respectively.

Figure 6:
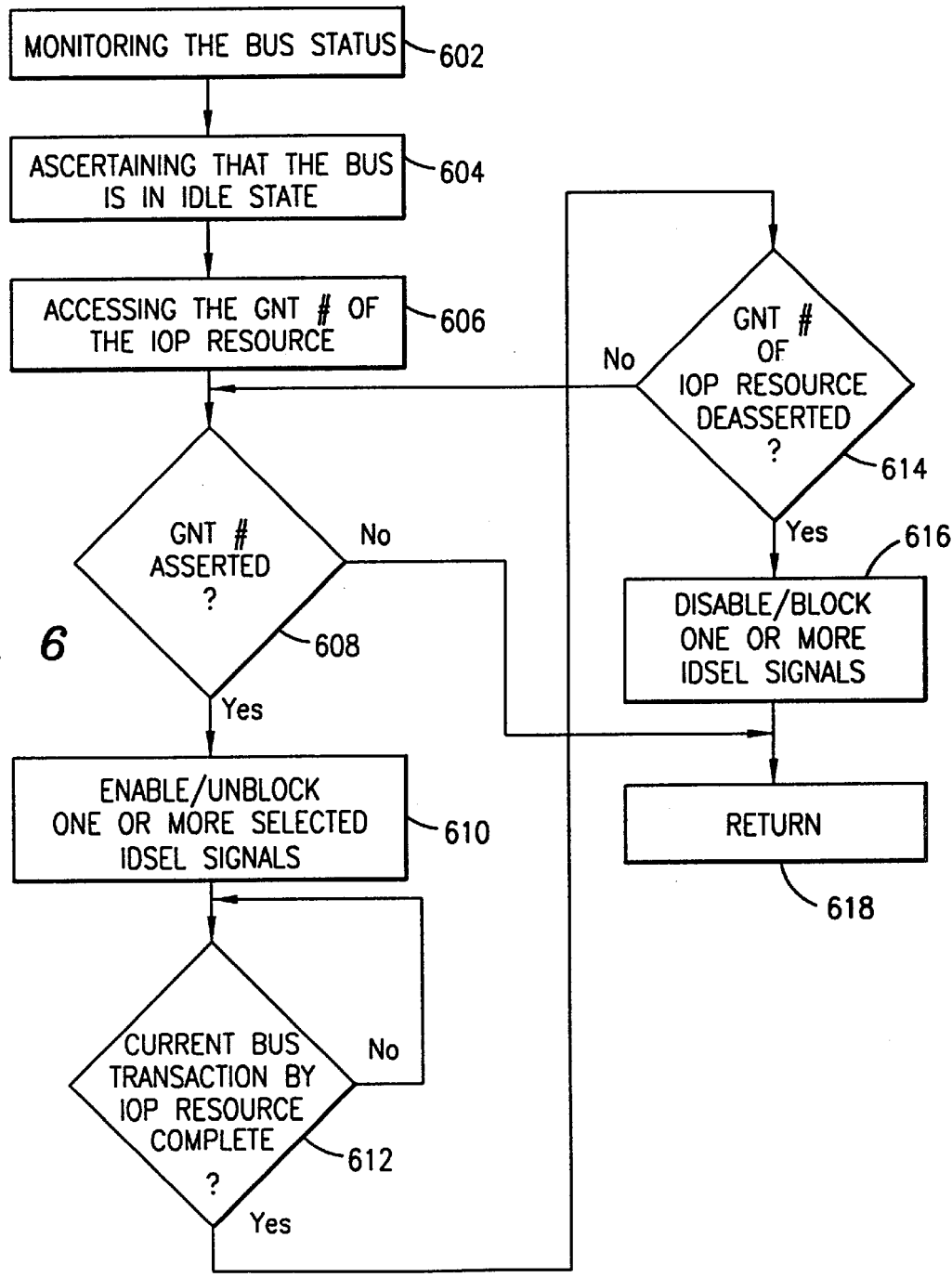
FIG. 6 depicts a flow chart of another exemplary embodiment of the methodology for dynamically blocking peripheral devices from a host processor and associated operating system in accordance with the teachings of the present invention.

Referring now FIG. 6, a flow chart for another exemplary embodiment of the methodology of the present invention is depicted. It can be readily understood upon reference hereto that this exemplary methodology is well adapted for use in a system wherein the bus arbiter is internal to the host bridge. Here, the emphasis is on when the IOP resource assumes the control of the bus transaction and accordingly enabling the appropriate IDSEL signals for the subordinate devices. Otherwise, the IDSEL signals would typically be blocked by means of deasserting (or masking) the suitable IDSEL ENABLE signals as described in the foregoing discussion. Further, depending on whether the address of the IOP resource is fixed or variable (for example, in a "hot plug" situation or when no particular slot is specifically allocated for the I$_2$O accelerator card), numerous arrangements may be had for distinguishing a host-associated transaction from all other transactions initiated by the other bus masters, including the IOP.

Continuing to refer to FIG. 6, the exemplary methodology depicted therein is especially adapted for use in an arrangement where the IOP's slot location is known and fixed. In that situation, it is relatively straightforward to discriminate the GNT# signal asserted by the I$_2$O accelerator card against a GNT# signal associated with the host processor and its OS. Accordingly, the I$_2$O accelerator card's GNT# signal may readily be accessed (step 606) after monitoring the bus status (step 602) and any bus idle state (step 604). If the I$_2$O accelerator card's GNT# signal is asserted (step 608), the IDSEL signal of a subordinate device is allowed to be asserted for which the bus transaction is intended (step 610). As has been described in reference to FIG. 5, suitable device enable/disable means is selectively actuated such that an appropriate IDSEL ENABLE signal is produced. This signal is used or produced such that the subordinate device's IDSEL signal is allowed to follow a level appropriate for the normal bus transaction when the I$_2$O accelerator card is accessing it.

Once the current bus transaction by the IOP resource is completed (step 612) and its GNT# signal is deasserted (step 514), the IDSEL ENABLE signal is accordingly deasserted or negated also, thereby closing the "access window" for that subordinate device. This is accomplished, in an exemplary embodiment, by utilizing at least in part a suitable device mask definition mechanism. If the GNT# signal of the 120 accelerator card is not asserted (step 608), the flow control is simply returned (step 618) without opening the access window.

Figure 7:
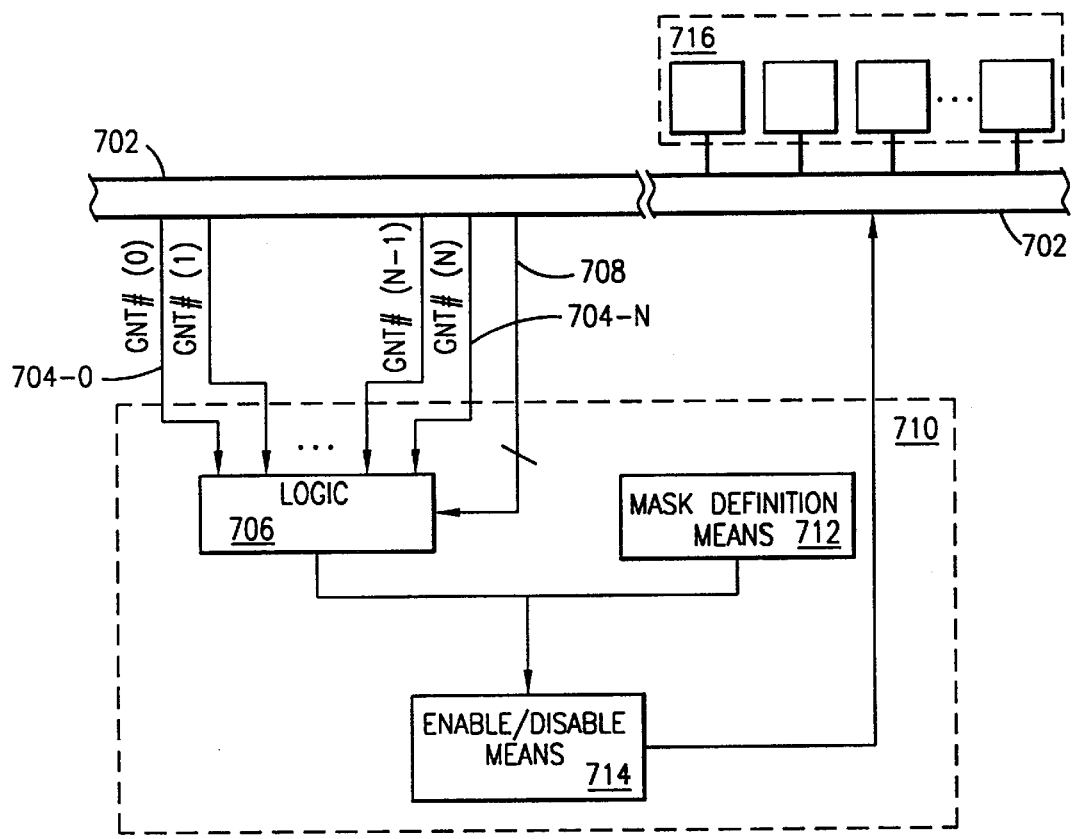
FIG. 7 illustrates a functional block diagram of an exemplary dynamic device blocking apparatus provided in accordance with the teachings of the present invention for purposes of hiding one or more subordinate peripheral devices.

Referring now to FIG. 7, a functional block diagram 700 of an exemplary dynamic device blocker module 710 is depicted in accordance with the teachings of the present invention. The exemplary module 710 comprises a suitable logic structure 706 that receives one or more GNT# signals, 704-0 through 704N, asserted by one or more bus masters (not shown) operating on an I/O bus 702, which bus masters include—in addition to an IOP resource—a host bridge or an up-stream bridge for generating a GNT# signal on behalf of a host processor. The logic structure 706 preferably receives other bus signals also, such as the FRAME#, IRDY# and clock signals, shown herein as signals 708.

The exemplary dynamic device blocker module 710 also comprises suitable mask definition means 712 which may preferably be initialized upon system configuration for the purpose of defining which subordinate peripheral devices need to be hidden from the host processor and its OS. Device enable/disable means 714, such as those described hereinabove, are selectively actuated in order to control the blocking or unblocking of the IDSEL signals associated with the subordinate devices 716. When the bus arbiter is external to the host bridge, the logic component 706 may preferably receive just three signals: the host-associated GNT#, FRAME# and IRDY# signals in addition to the bus clock. Also, when the slot location of the IOP resource is fixed and the arbiter is internal to the host bridge, the logic component 706 is operable with a minimum of the IOP's GNT# and the other signals. In the case of a variable IOP slot location, the GNT# signals of the bus masters other than the host bridge are also supplied to the logic component 706. Preferably, a suitable signal which is indicative of whether a bus master other than the host bridge on behalf of the host processor currently owns the bus may be generated using the aggregate GNT# signals.

Based upon the foregoing Detailed Description, it should now be apparent to those of ordinary skill in the art that the present invention provides a simple yet efficient system and method for dynamically providing a device blocking window or access window, as the case may be, for the purpose of rendering subordinate peripheral devices hidden from host processors and associated host OS. The present invention overcomes the shortcomings and deficiencies of the current technologies in that the devices that need to be hidden are not required to be located behind a PCI-to-PCI bridge. Nor the use a particular I/O processor (e.g., i960®) processor) is required. The present invention can be practiced with any generic processor that complies with the I$_2$O Specification for the purpose of controlling I/O transactions. It may be understood upon reference to the teachings herein that even one of the host processors in a multi-processor environment may be used for this purpose. Moreover, the risk of inadvertent accessing of a subordinate device by a bus master other than the IOP resource when it opens the access window is eliminated.

Although only certain embodiments of the apparatus of the present invention have been illustrated in the accompanying Drawings and described in the foregoing Detailed Description, it will be understood that the invention is not limited to the embodiments disclosed, but is capable of additional rearrangements, modifications and substitutions without departing from the spirit of the invention as set forth and defined by the following claims. Accordingly, it should be understood that the scope of the present invention encompasses all such arrangements and is solely limited by the claims as follows.

What is claimed is:

1. A computer system, comprising:

at least one host processor for executing a host operating system, said at least one host processor disposed on a host bus;

an input/output (I/O) bus operably coupled to said host bus via a host-to-bus bridge, said I/O bus for propagating at least one of a FRAME signal, a GRANT signal, an IRDY signal and a clock signal associated therewith;

a plurality of peripheral devices operably connected to said I/O bus, said plurality of peripheral devices for transferring data in I/O transactions;

a dynamic device blocker module disposed on said I/O bus for rendering at least a portion of said plurality of peripheral devices hidden from said host operating system based on said at least one of a FRAME signal, a GRANT signal, an IRDY signal and a clock signal associated therewith; and an accelerator module disposed on said I/O bus for controlling said at least a portion of said plurality of peripheral devices.

2. The computer system as set forth in claim 1, wherein said dynamic device blocker module comprises a register with a plurality of bit locations, said plurality of bit locations corresponding to said at least a portion of said plurality of peripheral devices such that a binary value in a particular bit location would control the blocking of an IDSEL signal associated with the corresponding one of said at least a portion of said plurality of peripheral devices.

3. The computer system as set forth in claim 1, wherein said dynamic device blocker module comprises a single integrated device.

* * * * *